UNITED STATES PATENT OFFICE.

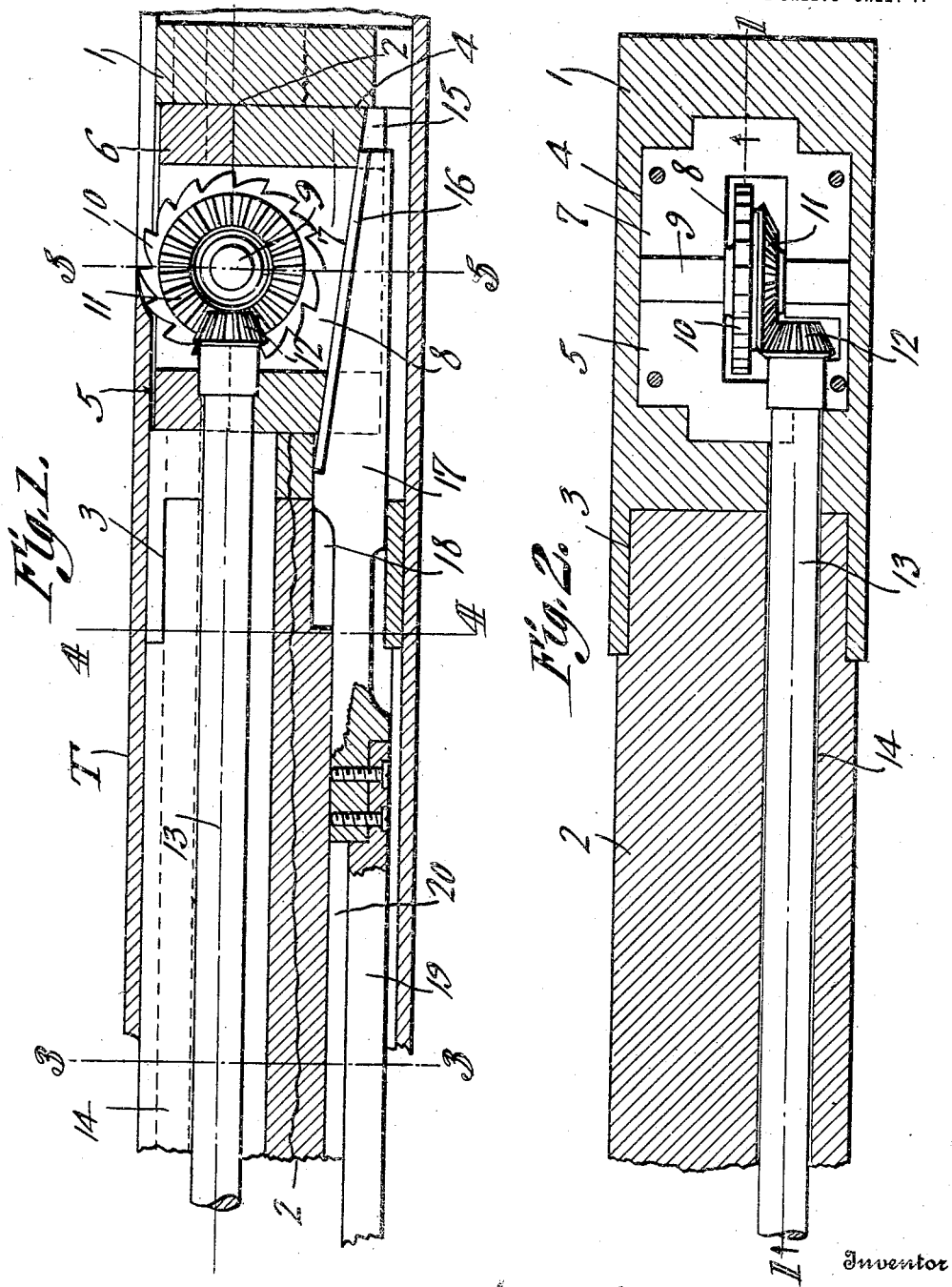

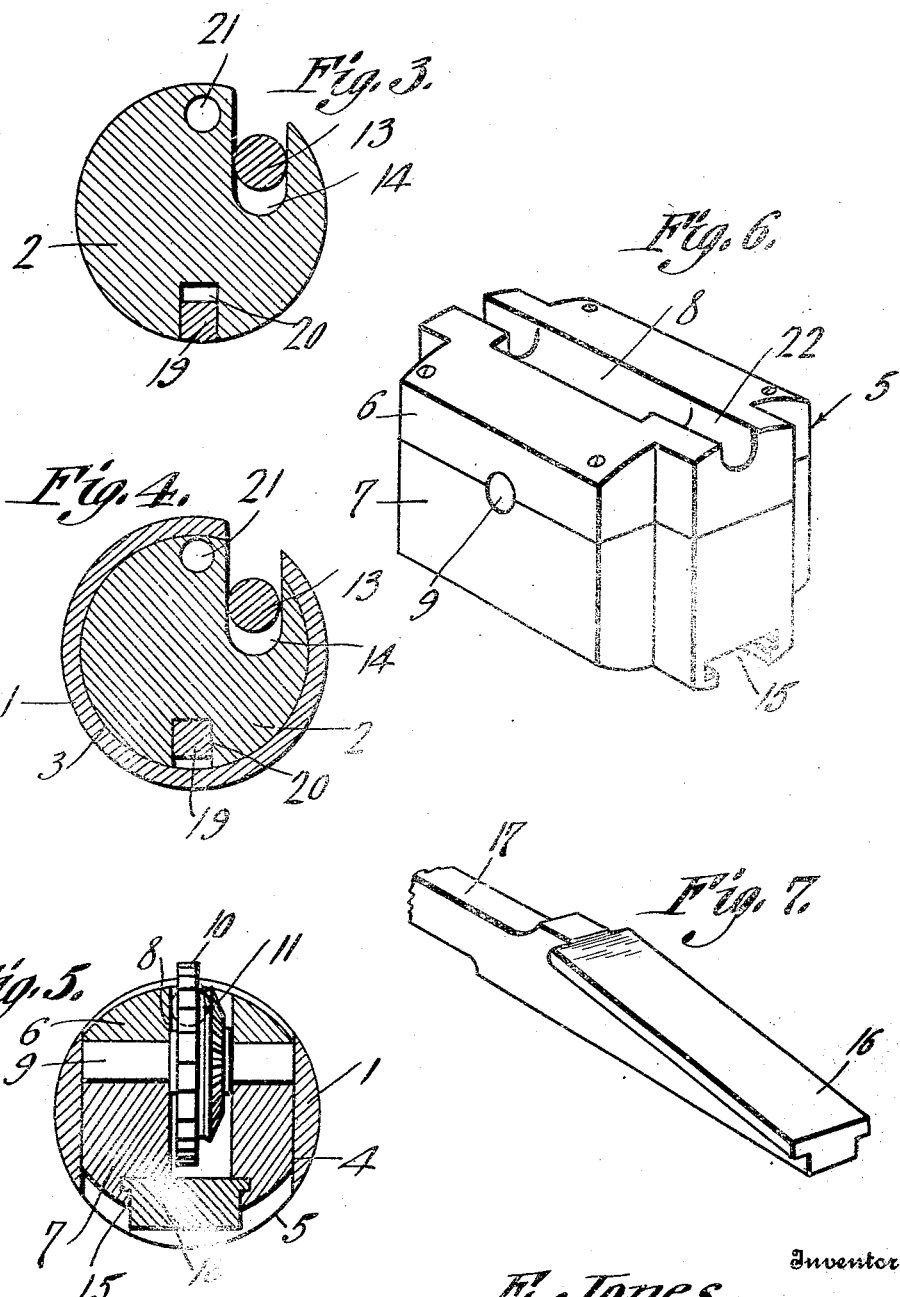

ELI JONES, OF LEXINGTON, TENNESSEE.

CUTTER-HEAD.

1,245,238.  Specification of Letters Patent.  Patented Nov. 6, 1917.

Application filed March 26, 1917. Serial No. 157,493.

*To all whom it may concern:*

Be it known that I, ELI JONES, a citizen of the United States, residing at Lexington, in the county of Henderson and State of Tennessee, have invented a new and useful Cutter-Head, of which the following is a specification.

The present invention appertains to metal working tools, and aims to provide a cutter head adapted especially for cutting slots in a tube from the interior thereof, such as in the manufacture of the slotted tube shown in my patent on well strainer, granted April 13, 1915, No. 1,135,809.

It is the object of the invention to provide a cutter head of the nature indicated receivable by the tube and having a milling cutter movable inwardly and outwardly to retracted and operative positions, the device embodying novel features of construction to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made without in the scope of what is claimed, without departing from the spirit of the invention.

The invention is illustrated in the accompanying drawings, wherein:—

Figure 1 is a longitudinal section of the cutter head taken on the line 1—1 of Fig. 2.

Fig. 2 is another longitudinal section taken on the line 2—2 of Fig. 1.

Figs. 3, 4, and 5 are cross sections taken on the respective lines 3—3, 4—4 and 5—5 of Fig. 1.

Fig. 6 is a perspective view of the slide or block which carries the milling cutter, the cutter being removed.

Fig. 7 is a fragmental perspective view of the wedge member for shifting the slide.

In carrying out the invention, there is provided a cylindrical body 1 attached to the end of a stem or shank 2 of suitable length, the body 1 having a recess 3 in which the end of the stem 2 is secured. The body and stem are adapted to enter the tube which is to be slotted, and the working parts are within the outline of said body and stem.

The body 1 is provided with a diametrical opening 4 in which a slide or block 5 is slidable diametrically or transversely. This slide embodies the sections 6 and 7 secured together by bolts or otherwise, and the slide 5 is provided with an opening 8 extending through the sections thereof. The milling cutter shaft 9 is seated and journaled between the sections 6 and 7 of the slide, whereby when the sections are separated, the shaft and cutter can be removed and replaced. A circular milling cutter 10 is mounted upon the shaft 9 within the opening 8 and its periphery projects slightly from said opening, as seen in Figs. 1 and 5. A bevel or other gear 11 is provided at one side of the cutter 10 in order that it can be rotated.

The actuating means for the cutter embodies a bevel or other gear 12 meshing with the bevel gear 11 and secured to the end of a longitudinal shaft 13 disposed for rotary and flexing movement within a longitudinal radial slot 14 with which the stem 2 is provided. The end of the shaft 13 is journaled in the slide 5 between the sections thereof, and the bearing of the shaft nearest the slide 5 is sufficiently remote therefrom, to permit said shaft to flex radially within the slot 14 as the slide 5 is shifted. The power can be supplied to the shaft 13 in any desirable manner.

As a means for shifting the slide 5 diametrically, the section 7 thereof is provided with an oblique or inclined T-shaped groove 15 engaged by an oblique or inclined portion of a wedge member 16 of T-shaped cross section, the wedge member 16 having a shank 17 working within a longitudinal recess or slot 18 with which the body 1 and end of the stem 2 are provided. When the member 16 is slid forwardly, it will wedge between the body 1 and slide 5 to project said slide; and when the member 16 is retracted, the slide will be retracted. A longitudinal bar 19 is connected to the shank 17 and is disposed within a longitudinal slot 20 provided in the stem 2 and said bar 19 can be reciprocated by a cam or any other suitable means for shifting the slide 5, as will be apparent.

The stem 2 is provided with a longitudinal passage 21 for the flow of a suitable fluid or solution to a longitudinal channel 22 with which the section 6 of the slide 5 is provided, said channel 22 intersecting the opening 8. This solution when pumped through the passage 21 into the channel 22 will flow around the cutter, whereby to keep the parts cool and therefore eliminate the heating of the parts and the consequent removing of the temper. Furthermore, the solution will serve to wash the cuttings from the milling tool or cutter, so that they will not obstruct or clog the working parts.

In operation, the tube T is slipped over the cutter head, although in some cases, the cutter head can be moved within the tube. The bar 19 is then moved relatively to the stem 2 so that the wedge 16 moves the slide 5 outwardly, thereby bringing the milling cutter 10 into engagement with the tube, said tube being moved longitudinally whereby the cutter cuts a longitudinal slot therein. The tube is moved lengthwise to provide the slot therein when the milling cutter is in projected position, and the bar 19 is pulled to retract the wedge 16 and therefore retract the slide 5 and cutter to provide the web between the slots, and after the tube has been moved a certain distance, the cutter is again projected to start the next slot in alinement with the one previously formed. The cutter can therefore be projected and retracted intermittently for cutting series of slots in the tube as the cutter head and tube are moved longitudinally relatively.

Having thus described the invention, what is claimed as new is:—

1. A cutter head embodying a body, a longitudinal stem connected to the body, a cutter movable transversely within the body, means extending longitudinally of the stem and connected to the cutter for rotating it, and means extending longitudinally of the stem for shifting the cutter transversely of the body to project and retract it.

2. A cutter head embodying a body, a longitudinal stem connected to the body, a slide movable transversely within the body, a cutter carried by the slide, a shaft extending longitudinally of the stem and connected to the cutter for actuating it, and means extending longitudinally along the stem and connected to said slide for shifting it transversely to project and retract the cutter.

3. A cutter head embodying a body, a stem connected to the body, a cutter movable transversely within the body means extending along the stem for actuating the cutter, means extending along the stem for shifting the cutter transversely to project and retract it, and said stem having a longitudinal passage for the flow of fluid therethrough to the cutter.

4. A cutter head embodying a body, a slide movable transversely therein, a cutter carried by the slide to be projected and retracted therewith, means connected to the cutter for actuating it, and a wedge member slidable within the body and connected to said slide for shifting it transversely.

5. A cutter head embodying a body, a stem connected thereto and having slots, a slide shiftable transversely within the body, a cutter carried by the slide, a longitudinal shaft extending in one of said slots and journaled in said slide, said shaft being connected to the cutter for actuating it, a longitudinally slidable wedge member in the body and engaging said slide for shifting it transversely, and a longitudinal bar within the other slot connected to said wedge member.

6. A cutter head embodying a body having a diametrical opening, a slide shiftable transversely of the body within said opening and comprising detachable sections, said slide having an opening extending through said sections, a cutter shaft journaled between the sections of the slide, a milling cutter carried by said shaft within the opening of the slide, a gear at one side of the cutter, a shaft having one end journaled between said sections of the slide, and a gear carried by said end of the shaft meshing with the aforesaid gear.

In testimony that I claim the foregoing as my own, I have hereto affixed my signature in the presence of two witnesses.

ELI JONES.

Witnesses:
 H. E. GRAPER,
 JNO. S. FIELDER.